June 14, 1960  J. A. K. RICHARDS  2,941,150
MEASURING CIRCUIT WITH TIME-VARIED ELECTRIC FILTER
Filed Dec. 19, 1955

INVENTOR.
J. A. K. Richards
BY
ATTORNEY

United States Patent Office 2,941,150
Patented June 14, 1960

2,941,150
MEASURING CIRCUIT WITH TIME-VARIED ELECTRIC FILTER

James A. K. Richards, Van Nuys, Calif., assignor to Bendix Aviation Corporation, North Hollywood, Calif., a corporation of Delaware Filed Dec. 19, 1955, Ser. No. 553,774

3 Claims. (Cl. 324—140)

This invention relates to electrical filters for separating currents of different frequencies, and is particularly useful in, although not limited to, low-pass filters for suppressing alternating currents and passing direct currents.

It is well recognized that following application of an input potential to a conventional filter there is a transient period before the output potential reaches a steady state. In many uses of filters, this delay in reaching a steady state condition is of no importance, but there are situations in which it is objectionable. One such situation is that in which the value of the direct component of a composite potential consisting of D.C. and A.C. components is to be measured at a given instant. The measuring apparatus, including a filter to suppress the A.C. component, is connected to the circuit carrying the composite potential at the instant the measurement is desired, but with conventional filters there is an objectionable time lag between the connection and the indication by the measuring apparatus of the true value of the D.C. component.

An object of the present invention is to reduce the time lag of an electrical filter without correspondingly impairing its suppression characteristics for undesired frequencies.

Briefly, this object is attained by varying the impedance of one or more of the filter elements as a function of time during what would otherwise be the transient period of the filter.

Other more specific objects and features of the invention will appear from the following detailed description with reference to the drawing, in which.

Figure 1:
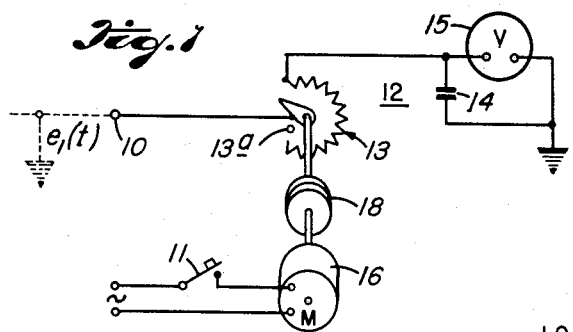
Fig. 1 is a diagram of a simple circuit incorporating the invention.
Figure 3:
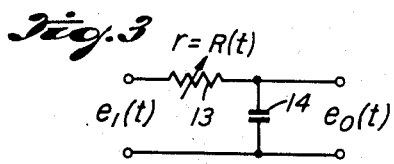
Fig. 3 is a schematic circuit of the variable filter in the system of Fig. 1.

Referring to Fig. 1, there is shown a circuit incorporating the invention for measuring at any given instant the potential of the D.C. component of a composite potential applied between ground and an input terminal 10. This potential is identified as $e_1(t)$, since it varies with time. The essential components of the circut are a switch 11, a filter 12 consisting of a series rheostat 13 and a shunt condenser 14, and a voltmeter 15. Actuation of the push-button switch 11 energizes a motor 16 which drives the rheostat 13 through a slip clutch 18. As shown, the rheostat 13 comprises an arcuate resistance element and a rotary slide contact connected to the terminal 10. In the normal starting position shown, the rheostat circuit is open. Upon closure of the switch 11, the movable contact first connects the terminal 10 directly to the condenser 14 and then moves over the resistance element to introduce resistance between terminal 10 and condenser 14 at a rate dependent upon the value of the resistance element and the speed of the motor 16. As will appear later, the resistance preferably increases linearly with time. A linear rate can be approximated by employing a fast-starting, constant-speed motor and/or tapering the rheostat to compensate for the acceleration rate of the motor. Alternatively, the motor can be running, and the rheostat slide can be connected thereto by a clutch at the instant of closure of the switch 11. The essence of the invention is a filter circuit as shown in Fig. 3, in which the resistance element 13 is varied from zero resistance, at the instant of starting, to a predetermined value $R(t)$ within a time span that is determined by the characteristics of the potential to be measured, particularly with reference to the lowest frequency component to be rejected.

Figure 2:
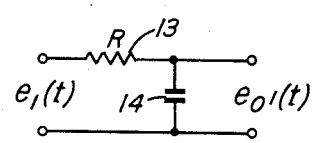
Fig. 2 is a schematic circuit of a conventional filter having fixed constants.
Figure 4:
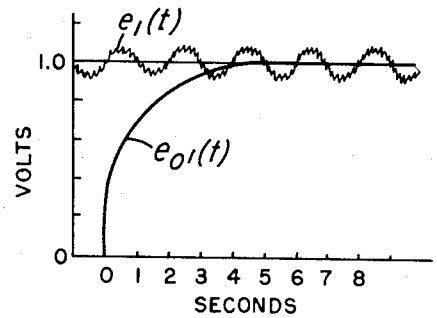
Fig. 4 is a graph showing the characteristics of a prior art filter in accordance with Fig. 2.

If, as in Fig. 2, the resistance element 13 were fixed, and it and the condenser 14 were large so as to substantially suppress low-frequency alternating current, the condenser 14 would have a substantial charging time. Hence, the output potential $e_0'(t)$, resulting from application to the input terminals of a potential $e_1(t)$ having a slowly varying D.C. compotent, would rise slowly as the condenser 14 charged, and would require a considerable transient period to reach a steady state value indicative of the value of the D.C. input component. This condition is illustrated in the graph of Fig. 4, in which several seconds are required following application of the input potential to the filter for the output potential $e_0'(t)$ to rise to the value of the D.C. component of the input potential $e_1(t)$. Obviously, with the prior art filter of Fig. 2, readings cannot be taken in rapid succession.

The transient period is reduced in accordance with the invention by varying the resistance of the rheostat 13 from an initial value of 0 (at the time of application of the input potential $e_1(t)$, to its full value in a time much less than the transient period of the circuit of Fig. 2. The initial low value of the rheostat 13 permits the condenser 14 to charge almost instantly to the full potential of the D.C. component of the input potential $e_1(t)$, but provides little filtering of the A.C. component. However, the rheostat rises to its full value within a much shorter time period than the normal transient period of the filter having a fixed resistor, and the output potential $e_0(t)$ reaches a steady state condition much sooner, as shown in Fig. 5.

Figure 5:
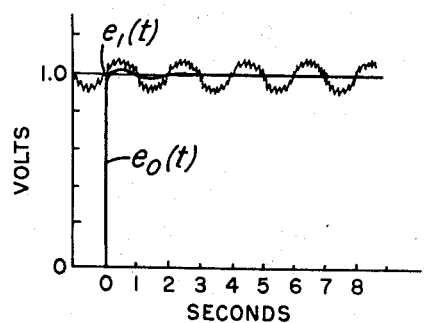
Fig. 5 is a graph showing the characteristics of the filter of the present invention in accordance with Fig. 3.

It will be observed from Fig. 5 that the potential $e_0(t)$ rises almost vertically to the value of the input potential $e_1(t)$ at that instant, whereas the time required for the rheostat 13 to attain its full value, in this particular instance, is two seconds. Until the product of RC has reached a value equal to that of the passive filter (Fig. 2), filtering of the A.C. component of the input potential $e_1(t)$ will not be as good as that of Fig. 2. Nevertheless, since the delay is substantially less than with a fixed filter, as shown in Fig. 4, that value can be reached in much less time than five seconds, thus permitting better filter action.

Fig. 5 is illustrative of the optimum results obtainable when the source of the input potential $e_1(t)$ has negligible internal impedance. In effect, such internal impedance constitutes a fixed impedance in series with the variable filter resistor 13 and slightly delays the rise of the output potential $e_0(t)$. When the internal impedance of the source is appreciable, it is desirable to reduce the size of the capacitance 14 and correspondingly increase the maximum resistance of the resistor 13. If the product of the resistance and the capacity is maintained constant, the A.C. filtering effect is maintained and the generator-to-condenser initial time constant reduced.

For purpose of analysis, assuming that the resistance of the variable resistor 13 rises linearly, the output potential $e_0(t)$ of the filter shown in Fig. 3 is represented by the following equation:

$$e_0(t) = \left(\frac{1}{RCt^{\frac{1}{RC}}}\right) \int_0^t \left(t^{\frac{1}{RC}-1}\right)(e_1(t))dt$$

in which:

R is the coefficient of the effective circuit resistance in ohms per second;
C is the shunt capacitance in farads;
$t$ is the time in seconds;
$e_1(t)$ is the input voltage as a function of time.

The response to a step function $$e_1(t) = \begin{cases} e_i t > 0 \\ 0 \; t < 0 \end{cases}$$

is $$e_0(t) = e_1(t) = e_i$$

For a ramp function $$e_0(t) = \frac{e_i t}{1+RC}$$

Figure 6:
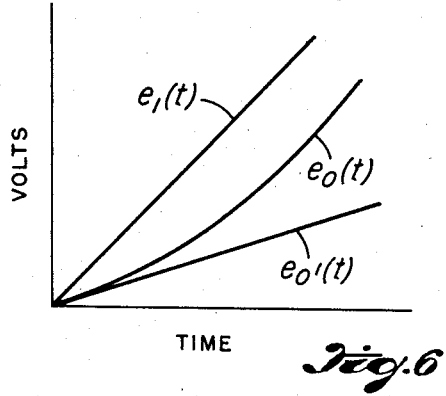
Fig. 6 is a graph showing the ramp characteristics of the filters of Figs. 2 and 3, respectively.

Compared to the response of the circuit of Fig. 2, the active filter of Fig. 3 suppresses the ramp in a ratio $$\frac{1}{1+RC}$$

while the standard circuit (Fig. 2) only delays the ramp but does not suppress it. Fig. 6 shows the difference.

The response to sine waves is similar and may be seen by comparing impedance functions. The impedance equation for the circuit of Fig. 2 is:

$$Z = \frac{1}{1+j\omega RC}$$

and for that of Fig. 3 is:

$$Z = \frac{1}{1+j\omega RCt}$$

If the product of RC of Fig. 3 is large compared to that of Fig. 2, the suppression of A.C. by the former equals that of the latter in a time equal to the ratio of the products.

In a practical circuit, the voltage source impedance must be finite instead of zero, as has been assumed. The actual response to a step function would be modified. The time constant is then the product of the generator internal resistance and the capacity of the filter. If the former is low, it may be ignored. If not, the filter is still superior, since the capacity may be reduced to attain a short time constant, and the filter resistance coefficient increased to maintain the product constant.

As an example, assume an input source having an approximate potential of one volt and an internal resistance of 100 ohms. When such a source is connected to a prior art filter, as shown in Fig. 2, having a resistance of $10^6$ ohms and a capacity of $10^{-6}$ farads, about five seconds are required for the output potential $e_0'$ to attain the value of the D.C. component of the input potential $e_i t$.

With the same source, but a filter in accordance with Fig. 3, having a resistance increasing from zero at the rate of $10^6$ ohms per second and a capacity of $10^{-6}$ farads, the output potential $e_0(t)$ will approximate the value of the input potential $e_1(t)$ in about .001 second, and will be very close to the value of the D.C. component thereof in about two seconds.

If it is desired to obtain only a single reading (within the first cycle of the rheostat 13), it is immaterial whether the latter continues to run. If it is desired to take continuous readings, the rheostat is stopped when it reaches its position of maximum value, as by providing a stop pin 13a for blocking the movable contact, the slip clutch 18 permitting such stoppage.

A valuable use of the variable filter of the invention is in test equipment for the rapid sequential measurement of the D.C. potentials of a plurality of circuits. Such a test equipment for measuring the potentials on a plurality of terminals 20 is shown in Fig. 7.

The terminals 20 are successively connected by a rotary switch 21 to a common lead 22 connected to the movable contact of the rheostat 13. The leading end of the rheostat resistance element is periodically momentarily connected by a rotary switch 23 to a recording voltmeter 24, as the rheostat reaches its maximum resistance during each rotation. Both the rheostat 13 and rotary switch 23 are driven continuously by the motor 16. The rotary switch 21 is driven, as by gears 25 and 26, at a lesser speed such that a different one of the terminals 20 is connected to the rheostat 13 during each successive cycle thereof. Since the use of the variable filter rheostat 13 greatly reduces the time required for each measurement, the potentials on a large number of terminals can be measured in rapid succession in a much shorter time than if a conventional filter were used.

Figure 7:
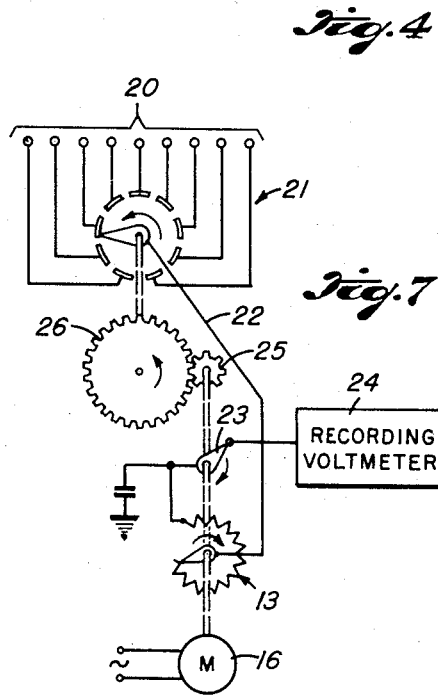
Fig. 7 is a diagram of a voltage checking system using the invention.

Two modes of operation of the system of Fig. 7 are possible, depending upon the phasing between the switch 21 and the rheostat 13. Thus, they may be so phased that the switch 21 connects a new terminal 20 to the line 22 while the rheostat is in open position; the rheostat then completes the circuit to the filter. On the other hand, the phasing can be such that the movable contact of the rheostat contacts the resistance element just before the switch 21 connects a new terminal 20 to the line 22; the switch 21 then completes the circuit to the filter.

Although for the purpose of explaining the invention a particular embodiment thereof has been shown and described, obvious modifications will occur to a person skilled in the art, and I do not desire to be limited to the exact details shown and described.

I claim:

1. An electrical filtering circuit comprising: input terminals and output terminals; a shunt impedance element connected across said output terminals; a variable series-impedance element variable between low and high impedances, respectively, and comprising a fixed impedance element and a tap movable onto one end of and thereafter along said fixed impedance element; means connecting said tap and said one end to said input and output terminals, respectively; motor means for continuously moving said tap first onto said one end of said fixed element and then therealong, whereby said series element is connected between said input and output terminals while in its low impedance condition, and the impedance of said series element is thereafter increased at a predetermined time rate.

2. An electrical filtering apparatus comprising: a plurality of input terminals and a pair of output terminals; a shunt impedance element connected across said output terminals; a variable series impedance element variable between low and high impedances, respectively; motor means in driving relation to said variable impedance element for varying it between low and high impedances at a predetermined time rate; switching means for selectively connecting said series element between any one of said input terminals and one of said output terminals, said switching means comprising a plurality of input contacts connected to said respective input terminals and a common contact sequentially connecting to different input contacts, and means driven by said motor for actuating said switching means for successively connecting said common contact to different input contacts during successive low impedance conditions of said variable impedance element.

3. Apparatus according to claim 2 including electrical indicating means and switching means actuated by said motor means for connecting said output terminals to said indicating means during successive high impedance conditions of said variable impedance element.

References Cited in the file of this patent

UNITED STATES PATENTS

| | | |
|---|---|---|
| 2,435,195 | Bomberger et al. | Feb. 3, 1948 |
| 2,469,383 | Gibbs et al. | May 10, 1949 |
| 2,470,895 | Marlowe et al. | May 24, 1949 |
| 2,473,542 | Philpott | June 21, 1949 |
| 2,480,636 | Dieke | Aug. 30, 1949 |
| 2,508,321 | Wilmotte | May 16, 1950 |
| 2,525,675 | Heller | Oct. 10, 1950 |
| 2,575,711 | Hipple et al. | Nov. 20, 1951 |
| 2,752,574 | Ragland | June 26, 1956 |
| 2,774,940 | Bernet | Dec. 18, 1956 |
| 2,856,468 | Berry | Oct. 14, 1958 |